(12) United States Patent
Park

(10) Patent No.: US 11,666,194 B2
(45) Date of Patent: Jun. 6, 2023

(54) ULTRASONIC SENSOR AND ROBOT CLEANER EQUIPPED THEREWITH

(71) Applicant: LG ELECTRONICS INC., Seoul (KR)

(72) Inventor: Jaehong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 16/756,205

(22) PCT Filed: Oct. 31, 2018

(86) PCT No.: PCT/KR2018/013106
§ 371 (c)(1),
(2) Date: Apr. 15, 2020

(87) PCT Pub. No.: WO2019/088695
PCT Pub. Date: May 9, 2019

(65) Prior Publication Data
US 2021/0186289 A1   Jun. 24, 2021

(30) Foreign Application Priority Data

Nov. 1, 2017 (KR) .......................... 10-2017-0144867

(51) Int. Cl.
*A47L 9/28*       (2006.01)
*A47L 11/40*      (2006.01)
*G01S 15/931*     (2020.01)

(52) U.S. Cl.
CPC ......... *A47L 9/2894* (2013.01); *A47L 11/4061* (2013.01); *G01S 15/931* (2013.01); *A47L 2201/02* (2013.01); *A47L 2201/04* (2013.01)

(58) Field of Classification Search
CPC ............... A47L 9/2894; A47L 11/4061; A47L 2201/02; A47L 2201/04; G01S 15/931
See application file for complete search history.

(56) References Cited

U.S. PATENT DOCUMENTS 5,446,445 A      8/1995  Bloomfield et al.
9,946,914 B1 *   4/2018  Kitchens, II ....... G06V 40/1388
(Continued)

FOREIGN PATENT DOCUMENTS

KR    10-1995-0008437    7/1995
KR    10-0829094         5/2008
(Continued)

OTHER PUBLICATIONS

International Search Report dated Feb. 18, 2019 issued in Application No. PCT/KR2018/013106.

*Primary Examiner* — Ernest G Tacsik
(74) *Attorney, Agent, or Firm* — KED & Associates, LLP

(57) ABSTRACT

In order to achieve the objective of the present disclosure, a robot cleaner for performing autonomous navigation according to one embodiment of the present disclosure comprises: a main body; a driving unit for moving the main body; an ultrasonic sensor for sensing a distance between the main body and an obstacle; and a controller for controlling the driving unit by using an output value of the ultrasonic sensor, wherein the ultrasonic sensor comprises: a transmitting unit, installed at one point on the outer surface of the main body, for emitting ultrasonic waves in a predetermined direction; a plurality of receivers, installed at positions spaced apart from the transmitting unit by a predetermined distance on the outer surface of the main body, for receiving ultrasonic waves reflected by the obstacle after being emitted from the transmitting unit; and an electrical signaling unit for electrically connecting at least one of the plurality of receivers to the transmitting unit.

16 Claims, 9 Drawing Sheets

(56) References Cited

U.S. PATENT DOCUMENTS

| | | | |
|---|---|---|---|
| 2004/0239651 A1* | 12/2004 | Sakurai | G06F 3/03545 |
| | | | 345/179 |
| 2012/0029351 A1* | 2/2012 | Hatayama | B06B 1/0207 |
| | | | 600/437 |
| 2013/0305483 A1* | 11/2013 | Dyson | A47L 9/1616 |
| | | | 15/353 |
| 2016/0089115 A1* | 3/2016 | Sato | A61B 8/06 |
| | | | 600/447 |
| 2016/0274579 A1 | 9/2016 | So et al. | |
| 2017/0045614 A1* | 2/2017 | Harres | G01S 15/46 |
| 2017/0052255 A1* | 2/2017 | Yu | A47L 9/2826 |
| 2020/0216129 A1* | 7/2020 | Sutherland | A61L 2/26 |

FOREIGN PATENT DOCUMENTS

| | | |
|---|---|---|
| KR | 10-1318854 | 10/2013 |
| KR | 10-1499966 | 3/2015 |
| KR | 10-1604762 | 3/2016 |
| KR | 10-2016-0126968 | 11/2016 |
| KR | 10-2017-0071121 | 6/2017 |

\* cited by examiner

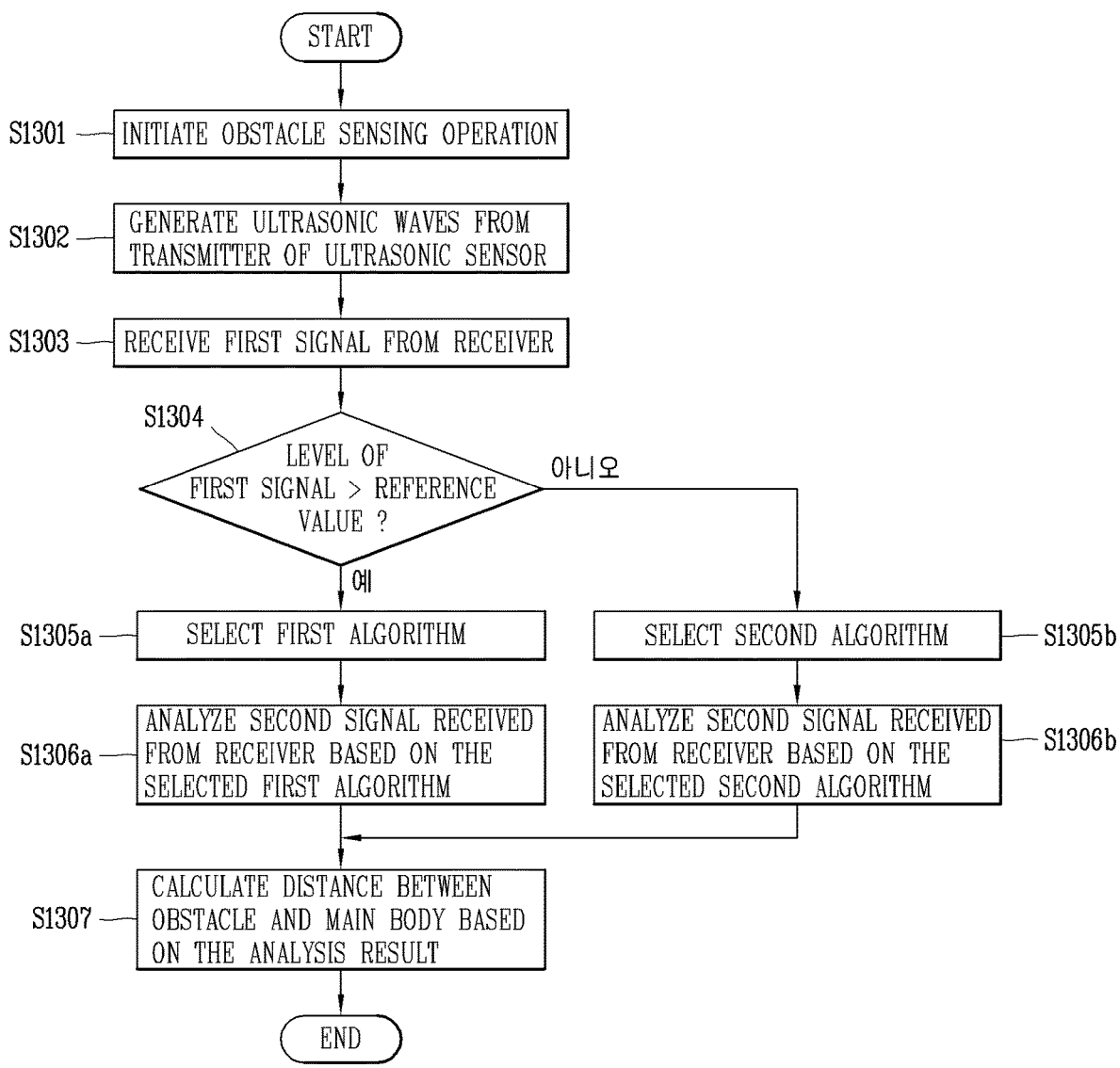

ULTRASONIC SENSOR AND ROBOT CLEANER EQUIPPED THEREWITH

CROSS-REFERENCE TO RELATED PATENT APPLICATIONS

This application is a U.S. National Stage Application under 35 U.S.C. § 371 of PCT Application No. PCT/KR2018/013106, filed Oct. 31, 2018, which claims priority to Korean Patent Application No. 10-2017-0144867, filed Nov. 1, 2017, whose entire disclosures are hereby incorporated by reference.

BACKGROUND

1. Technical Field

The present disclosure relates to an ultrasonic sensor having a classification device for classifying the types of ultrasonic sensors, a cleaner provided with the ultrasonic sensor to perform autonomous driving, and a control method thereof.

2. Description of the Related Art

In general, robots have been developed for industrial use and have been part of factory automation. In recent years, the field of application of robots has been expanded, and medical robots, aerospace robots, and the like have been developed, and household robots that can be used in ordinary homes have also been made.

A representative example of the household robot is a robot cleaner, which is a type of household appliance that sucks and cleans dust or foreign matter around the robot while traveling in a certain area by itself. Such a robot cleaner is generally provided with a rechargeable battery, and provided with an obstacle sensor capable of avoiding an obstacle while traveling so as to move and clean by itself.

In recent years, research has been actively carried out to use a robot cleaner in various fields such as health care, smart home, remote control, and the like, apart from merely autonomously driving in a cleaning area so as to perform a cleaning operation.

One of main factors for determining the performance of the robot cleaner is how close the main body of the robot cleaner is to a wall of a cleaning area.

When the main body is too far from the wall, there is a problem that the cleaning performance of the robot cleaner is deteriorated. On the other hand, the technical problem of preventing collision between the main body and the wall must be considered at the same time, and the task of the robot cleaner is to drive the main body as close as possible to the wall.

In general, the robot cleaner may sense an obstacle or a distance between the main body and the wall through an ultrasonic sensor.

In other words, the robot cleaner detects a distance between the robot cleaner and the wall of the cleaning area based on the output of the ultrasonic sensor, and controls the driving unit so that the main body of the robot cleaner is located as close as possible to the wall based on the detected distance.

Therefore, the performance of the ultrasonic sensor is an important variable that enables the robot cleaner to be as close as possible to the wall.

For reference, when the main body is developed to be closer to the wall by a predetermined millimeter, it is determined that the performance of the robot cleaner is meaningfully improved.

On the other hand, for the ultrasonic sensor, a plurality of models are mass-produced by a plurality of companies.

Here, the ultrasonic sensor outputs different waveforms from the transmitter and the receiver according to the characteristics of the device.

In other words, an algorithm for analyzing the output of the ultrasonic sensor needs to be optimized according to the ultrasonic sensor, and as the specifications of the ultrasonic sensor are changed, there is inconvenience in that the algorithm must also be changed.

In addition, in general, the robot cleaner is merely equipped with an algorithm capable of analyzing the output of an ultrasonic sensor corresponding to the characteristics of the ultrasonic sensor, but not equipped with a component or algorithm capable of directly detecting the characteristics of the ultrasonic sensor installed in the robot cleaner.

Therefore, when a failure occurs in the ultrasonic sensor of the robot cleaner, a newly replaced ultrasonic sensor may not be the same model as the previously installed ultrasonic sensor.

If a failure occurs in an ultrasonic sensor initially installed in the robot cleaner, then the ultrasonic sensor is replaced with another type of ultrasonic sensor, an algorithm initially installed in the controller of the robot cleaner may not match that of the replaced ultrasonic sensor.

In this case, the output of the ultrasonic sensor may not be accurately sensed, and accordingly, a problem occurs in which a distance between the main body of the robot cleaner and the wall is sensed incorrectly.

On the other hand, with regard to diagnostic technology for ultrasound waves, Korean Patent No. 10-1318854 (registered on Oct. 16, 2013) discloses a method of determining whether any one of a plurality of ultrasound sensors is normal using the plurality of ultrasound sensors.

However, Korean Patent No. 10-1318854 does not mention the possibility of mixing different types of ultrasonic sensors, and thus the above-described problem cannot be solved by only the technology disclosed in Korean Patent No. 10-1318854.

In addition, with regard to an ultrasonic signal optimization technology, Korean Patent Publication No. 10-2017-0071121 (published on Jun. 23, 2017) discloses a method of calculating a correction frequency by measuring a ringing time of an ultrasonic signal.

However, Korean Patent Publication No. 10-2017-0071121 may be able to calculate a correction frequency only by comparing the measured ringing time with a pre-stored ringing time, and thus there is a problem in that the ringing time, which is a comparison reference, cannot be set properly in a state that the type of the ultrasonic sensor is unknown.

SUMMARY

A technical problem to be solved by the present disclosure is to provide an ultrasonic sensor having a classification device capable of distinguishing ultrasonic sensors and a robot cleaner performing autonomous driving with the ultrasonic sensor.

Furthermore, an aspect of the present disclosure is to provide an ultrasonic sensor having a classification device capable of providing a user with information related to at least one of a product, a model, and a manufacturer of the ultrasonic sensor installed in a robot cleaner, and a robot cleaner provided with such an ultrasonic sensor to perform autonomous driving.

In addition, an aspect of the present disclosure is to provide an ultrasonic sensor having a classification device so as to accurately analyze the output of a receiver and a transmitter in the ultrasonic sensor without modifying the design of a main circuit board constituting a controller of the robot cleaner, and a robot cleaner provided with such an ultrasonic sensor to perform autonomous driving.

Moreover, an aspect of the present disclosure is to provide a robot cleaner that performs autonomous driving capable of preventing a malfunction caused by the ultrasonic sensor.

In order to solve the foregoing technical problems of the present disclosure, an ultrasonic sensor according to the present disclosure may include a transmitter that emits ultrasonic waves; a plurality of receivers installed at positions spaced apart from the transmitter by a predetermined distance to receive ultrasonic waves emitted from the transmitter; and an electrical signal transmission unit electrically connecting at least one of the transmitter and the plurality of receivers.

According to an embodiment, the electrical signal transmission unit may transmit a predetermined electrical signal to the receiver when the transmitter emits ultrasonic waves.

According to an embodiment, the electrical signal transmission unit may transmit a predetermined electrical signal to the receiver before the ultrasonic waves emitted by the transmitter reach the receiver.

According to an embodiment, the electrical signal transmission unit may transmit a predetermined electrical signal to the receiver before the receiver increases an output above a predetermined value in response to the ultrasonic waves emitted by the transmitter.

According to an embodiment, the electrical signal transmission unit may transmit a predetermined electrical signal to the receiver before an increase rate of output of the receiver is changed from a positive value to a negative value while the receiver changes an output in response to the ultrasonic waves emitted by the transmitter.

According to an embodiment, the electrical signal transmission unit may transmit a predetermined electrical signal to the receiver such that an overlapping region between a first signal output by the receiver in response to the electrical signal and a second signal output by the receiver in response to ultrasonic waves emitted by the transmitter is below a predetermined time interval.

According to an embodiment, the receiver may output a first signal by an electrical signal received from the electrical signal transmission unit, and output a second signal by ultrasonic waves emitted by the transmitter.

According to an embodiment, the receiver may output the first signal prior to the second signal.

According to an embodiment, a time range in which the first signal is output and a time range in which the second signal is output may overlap with each other within a predetermined time interval.

According to an embodiment, the transmitter may have a positive output terminal and a negative output terminal, and the electrical signal transmission unit may be connected between the negative output terminal and any one of the plurality of receivers.

According to an embodiment, the electric signal transmission unit may include a MOSFET.

According to an embodiment, a gate terminal of the MOSFET may be connected to a negative output terminal of the transmitter.

According to an embodiment, the electrical signal transmission unit may adjust a level of an electrical signal transmitted to the receiver based on information associated with the circuit characteristics of the transmitter and the receiver.

According to an embodiment, the electrical signal transmission unit may be turned off so as not to transmit an electrical signal to the receiver when a period during which the transmitter generates ultrasonic waves is reduced below a threshold period.

In addition, a robot cleaner performing autonomous driving according to the present disclosure may include a main body, a driving unit configured to move the main body, an ultrasonic sensor configured to sense a distance between the main body and an obstacle, and a controller configured to control the driving unit using an output value of the ultrasonic sensor, wherein the ultrasonic sensor includes a transmitter installed at a point on an outer surface of the main body to emit ultrasonic waves in a predetermined direction, a plurality of receivers installed at positions spaced apart from the transmitter by a predetermined distance on the outer surface of the main body to receive ultrasonic waves emitted from the transmitter and then reflected by the obstacle, and an electrical signal transmission unit electrically connecting at least one of the transmitter and the plurality of receivers, and the electrical signal transmission unit transmits a predetermined electrical signal to the receiver in addition to ultrasonic waves emitted from the transmitter.

According to an embodiment, a circuit constituting the electrical signal transmission unit may be installed separately from a circuit constituting the controller.

According to an embodiment, the electrical signal transmission unit may transmit a predetermined electrical signal to the receiver before ultrasonic waves emitted by the transmitter reaches the receiver.

According to an embodiment, the receiver may output a first signal by an electrical signal received from the electrical signal transmission unit, and output a second signal by ultrasonic waves emitted by the transmitter.

According to an embodiment, the receiver may output the first signal prior to the second signal.

According to an embodiment, the controller may receive an output of the first signal and an output of the second signal through a single harness.

According to an embodiment, the controller may detect information related to the characteristics of the ultrasonic sensor based on the output of the sensed first signal.

According to an embodiment, the information related to the characteristics of the ultrasonic sensor may include information related to at least one of a manufacturer, a type and a model of the ultrasonic sensor.

According to an embodiment, the robot cleaner may further include a memory for storing information related to a plurality of algorithms for analyzing the output of the ultrasonic sensor, and the controller may select any one of the plurality of algorithms based on the information related to the characteristics of the ultrasonic sensor, and analyze the output of the second signal using the selected algorithm, and calculate a distance between the obstacle and the main body based on the analysis result.

According to an embodiment, the controller may distinguish the output of the first signal and the output of the second signal based on a time point at which ultrasound waves are generated by the transmitter.

According to an embodiment, the controller may distinguish a signal generated at a time point closer to the time point at which the ultrasound was generated by the transmitter, as the first signal, between the outputs of the first and second signals.

According to the present disclosure, an effect of allowing a user or an administrator of a cleaner to receive information related to at least one of a product name, a type, and a manufacturer of an ultrasonic sensor installed in the robot cleaner without disassembling the robot cleaner is derived.

As a result, when the ultrasonic sensor previously installed in the robot cleaner is broken, the manager of the cleaner may prevent a malfunction of the cleaner by replacing it with an ultrasonic sensor of the same product as the relevant ultrasonic sensor.

Furthermore, according to the present disclosure, the user of the cleaner may distinguish the type of an ultrasonic sensor installed in the robot cleaner without changing the design of the controller of the robot cleaner, thereby enhancing user convenience.

In addition, according to the present disclosure, the controller of the cleaner may distinguish the type of the ultrasonic sensor using the output waveform of the ultrasonic sensor, thereby accurately analyzing the output of the ultrasonic sensor.

BRIEF DESCRIPTION OF THE DRAWINGS

FIG. 13 is a flowchart showing a control method of a robot cleaner having the ultrasonic sensor according to the present disclosure.

DETAILED DESCRIPTION OF THE EMBODIMENTS

Hereinafter, an embodiment disclosed herein will be described in detail with reference to the accompanying drawings, and it should be noted that technological terms used herein are merely used to describe a specific embodiment, but not limitative to the concept of the present disclosure.

Figure 1:
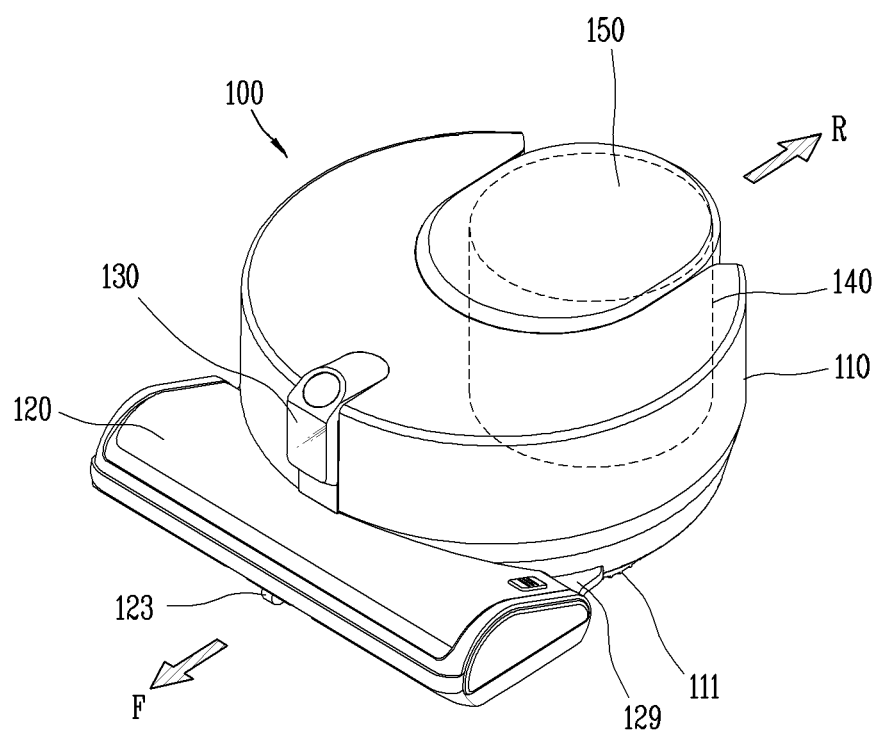
FIG. 1 is a perspective view illustrating an example of a robot cleaner that performs autonomous driving according to the present disclosure.
Figure 2:
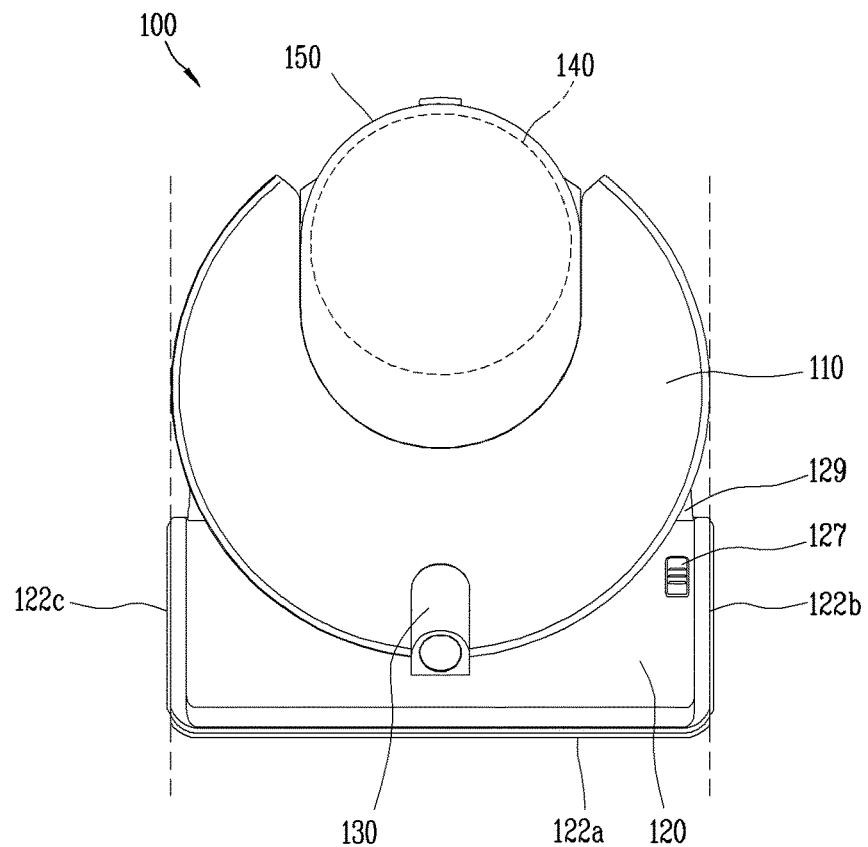
FIG. 2 is a plan view illustrating the robot cleaner that performs autonomous driving illustrated in FIG. 1.
Figure 3:
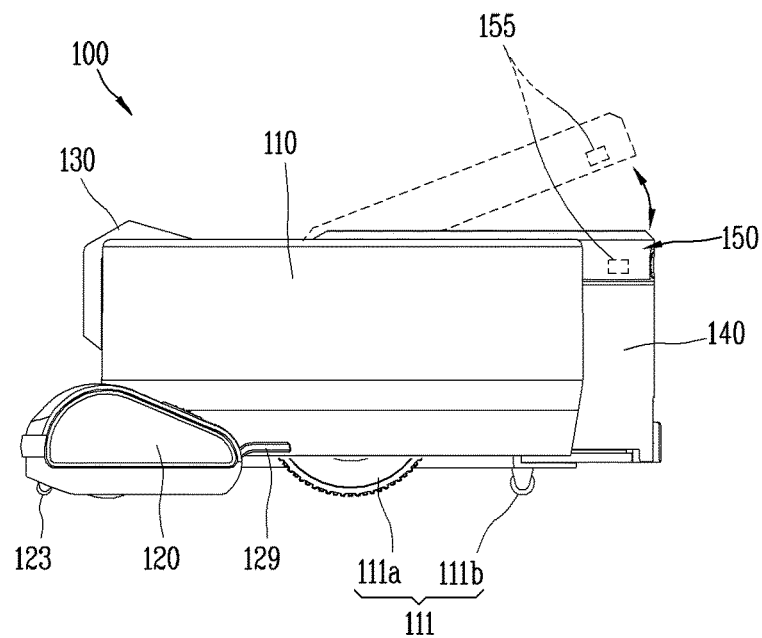
FIG. 3 is a side view illustrating the robot cleaner that performs autonomous driving illustrated in FIG. 1.

FIG. 1 is a perspective view illustrating an example of a robot cleaner 100 according to the present disclosure, FIG. 2 is a plan view of the robot cleaner 100 illustrated in FIG. 1, and FIG. 3 is a side view of the robot cleaner 100 illustrated in FIG. 1.

For reference, in this specification, a mobile robot, a robot cleaner, and a cleaner that performs autonomous driving may be used in the same sense.

Referring to FIGS. 1 through 3, the robot cleaner 100 performs a function of cleaning a floor while traveling on a predetermined area by itself. Cleaning of a floor mentioned here includes sucking dust (including foreign matter) on the floor or mopping the floor.

The robot cleaner 100 includes a cleaner body 110, a suction unit 120, a sensing unit 130, and a dust box 140.

The cleaner body 110 is provided with a controller (not shown) for the control of the robot cleaner 100 and a wheel unit 111 for the traveling of the robot cleaner 100. The robot cleaner 100 may move forward, backward, leftward and rightward by the wheel unit 111.

The wheel unit 111 includes main wheels 111a and a sub wheel 111b.

The main wheels 111a are provided on both sides of the cleaner body 110 and configured to be rotatable in one direction or another direction according to a control signal of the controller. Each of the main wheels 111a may be configured to be drivable independently from each other. For example, each main wheel 111a may be driven by a different motor.

The sub wheel 111b is configured to support the cleaner body 110 along with the main wheel 111a and assist the traveling of the robot cleaner 100 by the main wheel 111a. The sub wheel 111b may also be provided in the suction unit 120 which will be described later.

As described above, the controller is configured to control the driving of the wheel unit 111 in such a manner that the robot cleaner 100 autonomously travels on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

The suction unit 120 is disposed to protrude from one side of the cleaner body 110 to suck air containing dust. The one side may be a side on which the cleaner body 110 travels in a forward direction (F), that is, a front side of the cleaner body 110.

In the present drawing, it is shown that the suction unit 120 is protruded from one side of the cleaner body 110 to a front side and both left and right sides thereof. A front end portion of the suction unit 120 is disposed at a position spaced forward from one side of the cleaner body 110 and both left and right end portions of the suction unit 120 are disposed at positions spaced apart from one side of the cleaner body 110 to both left and right sides thereof.

As the cleaner body 110 is formed in a circular shape, and both ends of a rear end portion of the suction unit 120 are formed to protrude from the cleaner body 110 to both left and right sides thereof, a vacant space, namely, a gap, may be formed between the cleaner body 110 and the suction unit 120. The vacant space is a space between both left and right end portions of the cleaner body 110 and both left and right end portions of the suction unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space. The cover member 129 may be provided in the cleaner body 110 or the suction unit 120. According to the present embodiment, it is shown that the cover member 129 is formed in a protruding manner on both sides of a rear end portion of the suction unit 120, and disposed to cover an outer peripheral surface of the cleaner body 110.

The cover member 129 is disposed to fill at least part of the vacant space, that is, a vacant space between the cleaner body 110 and the suction unit 120. Therefore, it may be possible to implement a structure capable of preventing an obstacle from being caught in the vacant space, or being easily released from the obstacle even when the obstacle is caught in the vacant space.

The cover member 129 formed to protrude from the suction unit 120 may be supported on an outer circumferential surface of the cleaner body 110. If the cover member 129 is formed in a protruding manner from the cleaner body 110, then the cover member 129 may be supported on a rear portion of the suction unit 120. According to the above structure, when the suction unit 120 collides with an obstacle to receive an impact, part of the impact may be transmitted to the cleaner body 110 to disperse the impact.

The suction unit 120 may be detachably coupled to the cleaner body 110. When the suction unit 120 is separated from the cleaner body 110, a mop module (not shown) may be detachably coupled to the cleaner body 110 in place of the separated suction unit 120. Accordingly, the suction unit 120 may be mounted on the cleaner body 110 when the user wants to remove dust on the floor, and a mop module may be mounted on the cleaner body 110 when the user wants to mop the floor.

When the suction unit 120 is mounted on the cleaner body 110, the mounting may be guided by the cover member 129 described above. In other words, the cover member 129 may be disposed to cover an outer circumferential surface of the cleaner body 110, thereby determining a relative position of the suction unit 120 with respect to the cleaner body 110.

A sensing unit 130 is disposed in the cleaner body 110. The sensing unit 130 may be disposed at one side of the cleaner body 110 where the suction unit 120 is located, that is, in front of the cleaner body 110.

The sensing unit 130 may be disposed to overlap with the suction unit 120 in a vertical direction of the cleaner body 110. The sensing unit 130 is disposed at an upper portion of the suction unit 120 to sense an obstacle or geographic feature in front of the suction unit 120 so that the suction unit 120 positioned at the forefront of the robot cleaner 100 does not collide with the obstacle.

The sensing unit 130 is configured to additionally perform another sensing function in addition to the sensing function. It will be described in detail later.

The cleaner body 110 is provided with a dust bin accommodation portion 113, and the dust bin 140 for separating dust from the air sucked to collect the dust is detachably coupled to the dust bin accommodation portion 113. As illustrated in the drawing, the dust box accommodation portion 113 may be formed on the other side of the cleaner body 110, namely, behind the cleaner body 110.

A part of the dust box 140 is accommodated in the dust box accommodation portion 113 and another part of the dust box 140 is formed to protrude toward a rear side of the cleaner body 110 (i.e., a reverse direction (R) opposite to a forward direction (F)).

The dust box 140 is formed with an inlet 140a through which air containing dust is introduced and an outlet 140b through which air separated from dust is discharged, and when the dust box 140 is installed in the dust box accommodation portion 113, the inlet 140a and the outlet 140b are configured to communicate with a first opening 110a and a second opening 110b formed in an inner wall of the dust box accommodation portion 113, respectively.

The intake passage in the cleaner body 110 corresponds to a passage from the inlet port (not shown) communicating with the communicating portion 120b to the first opening 110a, and the discharge passage corresponds to a passage from the second opening 110b to the discharge port 112.

According to such a connection relation, air containing dust introduced through the suction unit 120 is introduced into the dust box 140 through an intake air passage in the cleaner body 110, and air and dust are separated from each other as they pass through a filter or cyclone of the dust box 140. Dust is collected in the dust box 140, and air is discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or mobile robot according to an embodiment of the present disclosure may include at least one of a communication unit 1100, an input unit 1200, a driving unit 1300, a sensing unit 1400, an output unit 1500, a power source unit 1600, a memory 1700 and a controller 1800, or a combination thereof.

Figure 4:
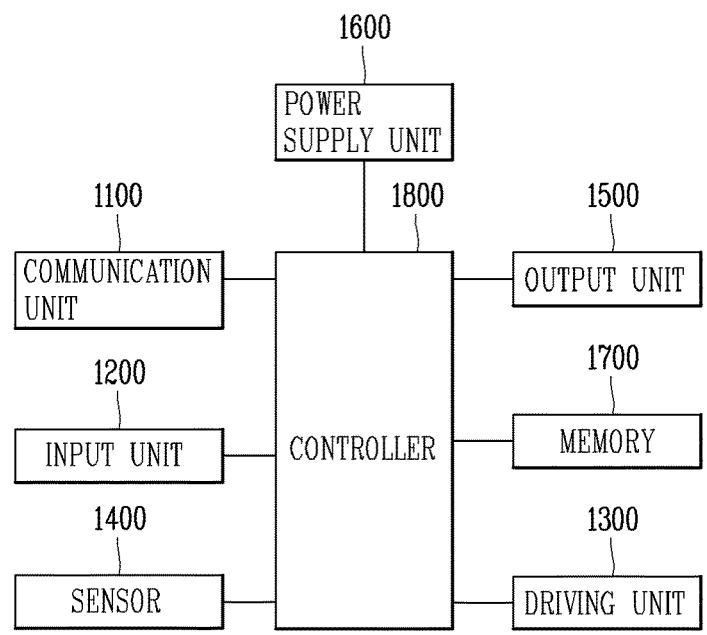
FIG. 4 is a block diagram illustrating the components of a robot cleaner that performs autonomous driving according to an embodiment of the present disclosure.

Here, it is needless to say that the components shown in FIG. 4 are not essential, and thus a robot cleaner having more or fewer components than shown in FIG. 4 may be implemented. Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to travel or perform a specific function.

Here, the controller 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the battery remaining amount on the screen by the controller.

The battery may be located in a lower portion of the center of the robot cleaner or may be located at either one of the left and right sides. In the latter case, the mobile robot may further include a balance weight for eliminating a weight bias of the battery.

On the other hand, the driving unit 1300 may be provided with a motor to drive the motor, thereby rotating the left and right main wheels in both directions to rotate or move the main body. The driving unit 1300 may allow the main body of the mobile robot to move forward, backward, leftward and rightward, travel in a curved manner or rotate in place.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on an upper portion of the mobile robot. In addition, the input unit 1200 may have a form of a touch screen along with the output unit 1500.

On the other hand, the output unit 1500 may be installed on an upper portion of the mobile robot. Of course, the installation position and installation type may vary. For example, the output unit 1500 may display a battery level state, a traveling mode or manner, or the like on a screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

Here, the sound output device may be a device for outputting sound such as a beeper, a speaker, or the like, and the output unit 1500 may output the sound to the outside through the sound output device using audio data or message data having a predetermined pattern stored in the memory 1700.

Accordingly, the mobile robot according to an embodiment of the present disclosure may output environment information on a traveling area on the screen or output it as sound. According to another embodiment, the mobile robot may transmit map information or environment information to a terminal device through the communication unit 1100 to output a screen or sound to be output through the output unit 1500.

On the other hand, the communication unit 1100 is connected to the terminal device and/or another device (mixed with term "home appliance" in this specification) located in a specific area in one of wired, wireless, satellite communication methods to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

On the other hand, the memory 1700 stores a control program for controlling or driving the robot cleaner and the resultant data. The memory 1700 may store audio information, image information, obstacle information, position information, map information, and the like. Furthermore, the memory 1700 may store information related to a traveling pattern.

The memory 1700 mainly uses a nonvolatile memory. Here, the nonvolatile memory (NVM, NVRAM) is a storage device capable of continuously storing information even when power is not supplied thereto, and for an example, the nonvolatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a lower camera sensor, an upper camera sensor and a three-dimensional camera sensor.

The external signal detection sensor may sense an external signal of the mobile robot. The external signal detection sensor may be, for example, an infrared ray sensor, an ultrasonic sensor, a radio frequency (RF) sensor, or the like.

For reference, the ultrasonic sensor is described in more detail in FIG. 6 below.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

According to an embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle to output ultrasonic waves transmitted from the ultrasonic sensor in an upward direction, and here, the ultrasonic sensor may further include a predetermined blocking member to prevent ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific region without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long-distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The controller 1800 may measure an infrared angle between an emission signal of infrared rays emitted from the cliff detection sensor toward the ground and a reflection signal reflected and received by the obstacle to sense a cliff and analyze the depth thereof.

On the other hand, the controller 1800 may determine whether or not to pass according to the ground state of the sensed cliff using the cliff detection sensor, and determine whether or not to pass through the cliff according to the determination result. For example, the controller 1800 determines whether or not a cliff is present and a depth of the cliff through the cliff detection sensor, and then passes through the cliff only when a reflection signal is sensed through the cliff detection sensor.

For another example, the controller 1800 may determine a lifting phenomenon of the mobile robot using the cliff detection sensor.

Meanwhile, the lower camera sensor is provided on a rear surface of the mobile robot to acquire image information on a lower surface, that is, a bottom surface (or a surface to be cleaned) during movement. The lower camera sensor is also referred to as a lower camera sensor. The lower camera sensor converts a downward image input from an image sensor provided in the sensor to generate image data in a predetermined format. The generated image data may be stored in the memory 1700.

Furthermore, one or more light sources may be installed adjacent to the image sensor. The one or more light sources irradiate light to a predetermined region of the bottom surface captured by the image sensor. In other words, when the mobile robot moves in a specific region along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the lower camera sensor, the controller 1800 may detect a position of the mobile robot irrespective of the slip of the mobile robot. The controller 1800 may compare and analyze the image data captured by the lower camera sensor over time to calculate the moving distance and the moving direction, and calculate the position of the mobile robot on the basis of the moving distance and the moving direction. Using image information on a bottom side of the mobile robot using the lower camera sensor, the controller 1800 may perform slip-resistant correction on the position of the mobile robot calculated by another device.

On the other hand, the upper camera sensor may be installed so as to face upward or forward of the mobile robot to photograph the surroundings of the mobile robot. When the mobile robot is provided with a plurality of upper camera sensors, the camera sensors may be disposed on a top or side surface of the mobile robot at a determined distance or angle.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

According to an embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

In the following FIG. 5, an embodiment showing an installation aspect of a cleaner 100 and a charging station 510 in a cleaning area will be described.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. According to an embodiment, the charging station 510 may be installed at an outer edge of the cleaning area 500.

Figure 5:
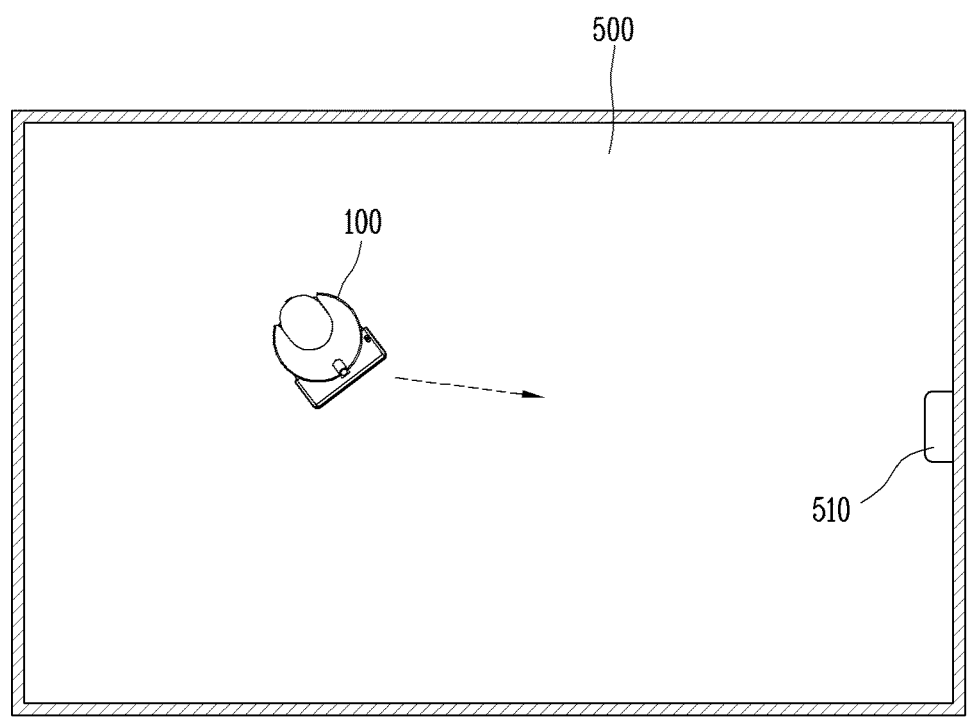
FIG. 5 is a conceptual view illustrating an example in which a robot cleaner and a charging station according to the present disclosure are installed in a cleaning area.

Although not shown in FIG. 5, the charging station 510 may include a communication device (not shown) capable of emitting different types of signals, and the communication device may perform wireless communication with the communication unit 1100 of the cleaner 100.

The controller 1800 may control the driving unit 1300 such that the main body of the cleaner 100 is docked to the charging station 510 based on a signal received at the communication unit 1100 from the charging station 510.

The controller 1800 may move the main body in a direction of the charging station 510 when a remaining capacity of the battery falls below a limit capacity, and control the driving unit 1300 to start a docking function when the main body is close to the charging station 510.

In the following FIG. 6, the components of an ultrasonic sensor provided in a typical robot cleaner 100 will be described.

Figure 6:
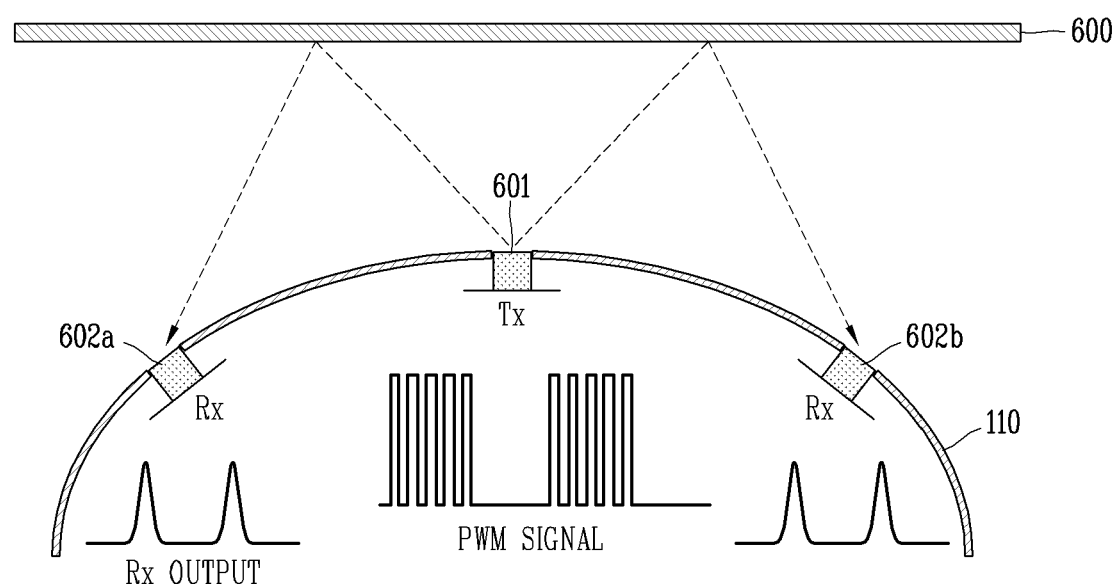
FIG. 6 is a conceptual view showing an embodiment of a typical ultrasonic sensor.

Referring to FIG. 6, the ultrasonic sensor may include an transmitter (Tx) 601 that emits ultrasonic waves and receivers (Rxs), 602a, 602b that receive ultrasonic waves emitted from the transmitter.

The transmitter 601 emits ultrasonic waves to an obstacle 600, and the emitted ultrasonic waves are reflected from an outer surface of the obstacle 600. The receivers 602a, 602b receive ultrasonic waves reflected by the obstacle 600.

At this time, a circuit unit (not shown) constituting the transmitter 601 may measure a period of time it takes to reach the receivers 602a, 602b from the time point when the ultrasonic waves are emitted, thereby sensing a distance between the ultrasonic sensor and the obstacle.

As illustrated in FIG. 6, the transmitter 601 may generate a pulse width modulated (PWM) signal to emit ultrasonic waves, and the receivers 602a, 602b may output a predetermined waveform in response to the received ultrasonic waves.

In order to sense a distance from the obstacle as described above, a plurality of receivers may correspond to a single transmitter. In other words, a single ultrasonic sensor may include a single transmitter and a plurality of receivers.

In an example illustrated in FIG. 6, the ultrasonic sensor may include two receivers 602a, 602b, and the two receivers are installed at positions spaced apart by a predetermined distance to the left and right sides of the transmitter 601, respectively.

In an example illustrated in FIG. 6, the transmitter 601 may be installed at a point on an outer surface of the main body 110 of the cleaner 100, and the receivers 602a, 602b may be installed at positions spaced apart by a predetermined distance from the transmitter on the outer surface of the main body 110. Specifically, the first receiver 602a may be installed on the left side from the transmitter based on a forward direction of the main body 110, and the second receiver 602b may be installed on the right side from the transmitter based on the forward direction of the body 110.

The controller 1800 of the cleaner 100 may be connected to the transmitter 601 to receive the outputs of the receivers 602a, 602b through the transmitter 601, and calculate a distance between the obstacle and the main body 110 using the outputs of the receivers 602a, 602b.

Meanwhile, the controller 1800 may use an algorithm previously stored in the memory 1700 to analyze the outputs of the receivers 602a, 602b of the ultrasonic sensor. At this time, the algorithm may be provided to analyze the output of the ultrasonic sensor, which is designed to correspond to the characteristics of the ultrasonic sensor installed in the cleaner 100.

Therefore, when any one of the manufacturer, type, and model of the ultrasonic sensor is changed, the algorithm used by the controller 1800 to sense the output of the ultrasonic sensor must also be changed.

In other words, when the manufacturer, type, or model of the ultrasonic sensor is different, the characteristics of the ultrasonic sensor are different, and therefore, in order to accurately analyze the output of the ultrasonic sensor of a specific model manufactured by a specific manufacturer, an algorithm designed to correspond to the characteristics is required.

For example, a first ultrasonic sensor manufactured by manufacturer A and a second ultrasonic sensor manufactured by manufacturer B may have different characteristics in a distance between the receiver and the transmitter, an amplification gain of the receiver, an ultrasonic intensity generated by the transmitter and a shape of waveform generated by the receiver.

Therefore, when an algorithm designed for any one of the first and second ultrasonic sensors is applied to both the first ultrasonic sensor and the second ultrasonic sensor, there is a problem that the output of the other one of the first and second ultrasonic sensors cannot be accurately analyzed.

Furthermore, in general, an algorithm for analyzing the output of the ultrasonic sensor is mounted on the controller 1800 or the memory 1700 in the cleaner 100, and the characteristics of the ultrasonic sensor are determined by a circuit constituting the transmitter and receiver.

In general, when it is considered a situation that the manufacturer of the cleaner 100 and the manufacturer of the ultrasonic sensor are different, it is inevitable that a characteristic derived by the transmitter and receiver of the ultrasonic sensor and an algorithm mounted on the controller of the cleaner do not match each other.

At present, when manufacturing a robot cleaner, the manufacturer, type, and model of an ultrasonic sensor are checked, and an algorithm corresponding to the checked data is selectively mounted on the controller 1800, and this work may increase the manufacturing time and cause inconvenience.

In order to solve this problem, in the present disclosure, a robot cleaner that transmits information related to the characteristics of an ultrasonic sensor to the controller 1800 so as to detect the characteristics of the ultrasonic sensor without changing the design of a circuit constituting the controller 1800 of the cleaner, and including the same will be described.

Figure 7:
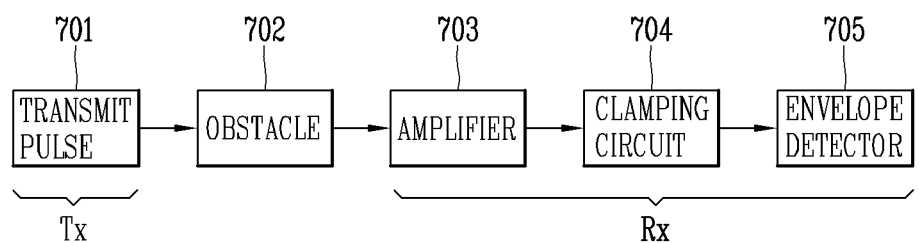
FIG. 7 is a conceptual view showing a process of allowing an ultrasonic sensor to detect ultrasonic waves.

In the following FIG. 7, a process of sensing ultrasonic waves in an ultrasonic sensor provided in a typical robot cleaner 100 will be described.

The transmitter (Tx) transmits a pulse (701), and the transmitted pulse is reflected (702) from an obstacle to enter the receiver (Rx).

The receiver (Rx) receives the pulse reflected by the obstacle, and allows the reflected pulse to sequentially pass through an amplifier 702, a clamping circuit 703, and an envelope detector 704, thereby output a predetermined waveform.

The amplifier 702, the clamping circuit 703, and the envelope detector 704 are known in the art of the present disclosure, and thus the detailed description will be omitted.

Hereinafter, in FIG. 8, the components of the ultrasonic sensor according to the present invention will be described.

For reference, in the present disclosure, an ultrasonic sensor including one transmitter and two receivers will be described, but this is for convenience of description. In other words, the idea of the present disclosure may be applicable to an ultrasonic sensor including one receiver or three or more receivers.

Figure 8:
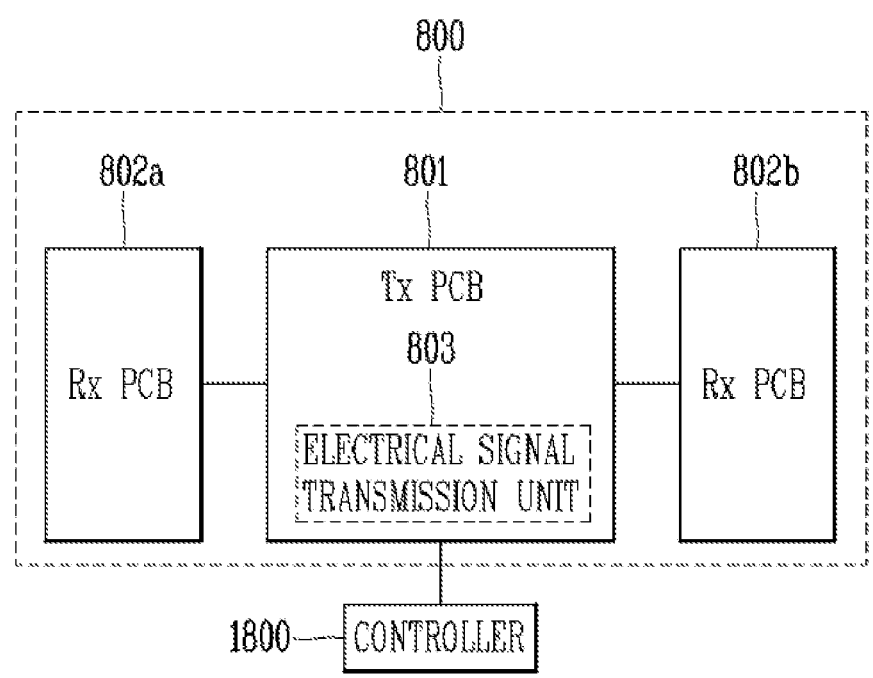
FIG. 8 is a block diagram showing the components of an ultrasonic sensor according to the present disclosure.

As illustrated in FIG. 8, the ultrasonic sensor 800 according to the present disclosure may include a transmitter 801, a first receiver 802a, and a second receiver 802b.

In particular, the transmitter 801 may be provided with an electrical signal transmission unit 803 that electrically connects the transmitter to at least one of the first and second receivers 802a, 802b.

In other words, the electrical signal transmission unit 803 may transmit an electrical signal to at least one of the first and second receivers 802a, 802b, in addition to ultrasonic waves generated by the transmitter 801. The receivers 802a, 802b that have received electrical signals from the electrical signal transmission unit 803 may output a predetermined voltage waveform.

Specifically, when the transmitter 801 emits ultrasonic waves, the electrical signal transmission unit 803 may transmit a predetermined electrical signal to at least one of the first and second receivers 802a, 802b.

When the transmitter 801 generates a PWM signal for emitting ultrasonic waves, an electrical signal may be generated from the electrical signal transmission unit 803 by the generated PWM signal. In other words, the PWM signal for emitting ultrasonic waves and the electrical signal of the electrical signal transmission unit 803 may be generated at substantially the same time point.

The electrical signal transmission unit 803 is connected between the transmitter 801 and the receivers 802a, 802b to transmit the generated electrical signal to the receivers 802a, 802b.

According to an embodiment, the electrical signal transmission unit 803 may be provided in the transmitter 801. In other words, the electrical signal transmission unit 803 may be part of a circuit configuration corresponding to the transmitter 801. Accordingly, the electrical signal transmission unit 803 may be connected to any one point and another point of a circuit constituting the transmitter 801, respectively, and connected to at least one of the receivers 802a, 802b.

In another embodiment, the electrical signal transmission unit 803 may be provided separately from the controller 1800 of the cleaner 100. In other words, the electrical signal transmission unit 803 is provided outside the controller 1800, and does not require a design change of the controller 1800.

The receivers 802a, 802b may receive electrical signals from the electrical signal transmission unit 803 prior to receiving ultrasonic waves from the transmitter 801.

The receivers 802a, 802b may output a first signal in response to an electrical signal received from the electrical signal transmission unit 803, and may output a second signal in response to ultrasonic waves emitted from the transmitter 801.

At this time, an output waveform of the first signal and an output waveform of the second signal may be formed differently. For example, a peak value of the first signal, which is a pulse output by the electrical signal, may be formed differently from that of the second signal, which is a pulse output by ultrasonic waves. In another example, a period of the first signal may be different from that of the second signal.

As described above, since the first signal and the second signal form different output waveforms, the controller 1800 that senses the output of the ultrasonic sensor, may distinguish a first and a second signal even when there is a section in which the first signal and the second signal partially overlap with each other.

On the other hand, a time point at which an electrical signal generated by the electrical signal transmission unit 803 is transmitted to the receivers 802*a*, 802*b* may be preferably adjusted such that the receivers 802*a*, 802*b* initially outputs a first signal, and then outputs a second signal after an output waveform due to the first signal disappears.

When an output of the first signal and an output of the second signal overlap with each other, a time point at which an electrical signal generated by the electrical signal transmission unit 803 is transmitted to the receivers 802*a*, 802*b* may be preferably adjusted to detect a peak value of the first signal and a peak value of the second signal.

Referring to a block diagram illustrated in FIG. 8, an embodiment in which the electrical signal transmission unit 803 is provided in the transmitter 801 has been described, but the electrical signal transmission unit 803 may also be installed independently of the transmitter 801.

In other words, the electrical signal transmission unit 803 may be defined as an independent component. Therefore, the electric signal transmission unit 803 may be additionally installed in an ultrasonic sensor in the related art that includes only a transmitter and a receiver. For example, the electrical signal transmission unit 803 may be provided between the transmitter and the receiver, or may be provided in the transmitter.

Meanwhile, the electrical signal transmission unit 803 may variably adjust a level of the electrical signal transmitted to the receiver. Preferably, the electrical signal transmission unit 803 may set a level of the electrical signal transmitted to the receiver based on information related to the circuit characteristics of the transmitter 801 and the circuit characteristics of the receiver 803. When a level of the electrical signal is changed, a waveform of the first signal may also be changed. In other words, when the electrical signal transmission unit 803 is provided in different types of ultrasonic sensors, electrical signals of different sizes may be transmitted to the receiver.

Hereinafter, various embodiments related to an aspect in which the electrical signal transmission unit 803 transmits an electrical signal will be described.

According to an embodiment, the electrical signal transmission unit 803 may transmit a predetermined electrical signal to the receiver before ultrasonic waves emitted by the transmitter 801 reach the receiver.

In another embodiment, the electrical signal transmission unit 803 may transmit a predetermined electrical signal to the receivers 802*a*, 802*b* before the receivers 802*a*, 802*b* increase an output above a preset voltage value in response to ultrasonic waves emitted by the transmitter 801. At this time, the preset voltage value may correspond to a peak value of the first signal.

In another embodiment, the electrical signal transmission unit 803 may transmit a predetermined electrical signal to the receivers 802*a*, 802*b* to decrease the output of the first signal below a preset second voltage value before the receivers 802*a*, 802*b* increase the output of the second signal above a preset first voltage value.

In yet still another embodiment, the electrical signal transmission unit 803 may transmit a predetermined electrical signal to the receivers 802*a*, 802*b* before an increase rate of output of the receivers 802*a*, 802*b* is changed from a positive value to a negative value while the receivers 802*a*, 802*b* change the output in response to ultrasonic waves emitted by the transmitter 801.

In still yet another embodiment, the electrical signal transmission unit 803 may transmit a predetermined electrical signal to the receivers 802*a*, 802*b* before the receivers 802*a*, 802*b* allows an output waveform by the first signal to disappear before an increase rate of output by the second signal decreases below zero.

In yet still another embodiment, the electrical signal transmission unit 803 may transmit a predetermined electrical signal to the receiver such that an overlapping region between a first signal output by the receiver in response to an electrical signal and a second signal output by the receiver in response to ultrasonic waves emitted by the transmitter is below a predetermined time interval.

In still yet another embodiment, the electrical signal transmission unit 803 may transmit a predetermined electrical signal to the receivers 802*a*, 802*b* within a predetermined time interval from a time point when the transmitter 801 generates a PWM signal for emitting ultrasonic waves.

In the following FIG. 9, the components of the electrical transmission unit 803 will be described.

Figure 9:
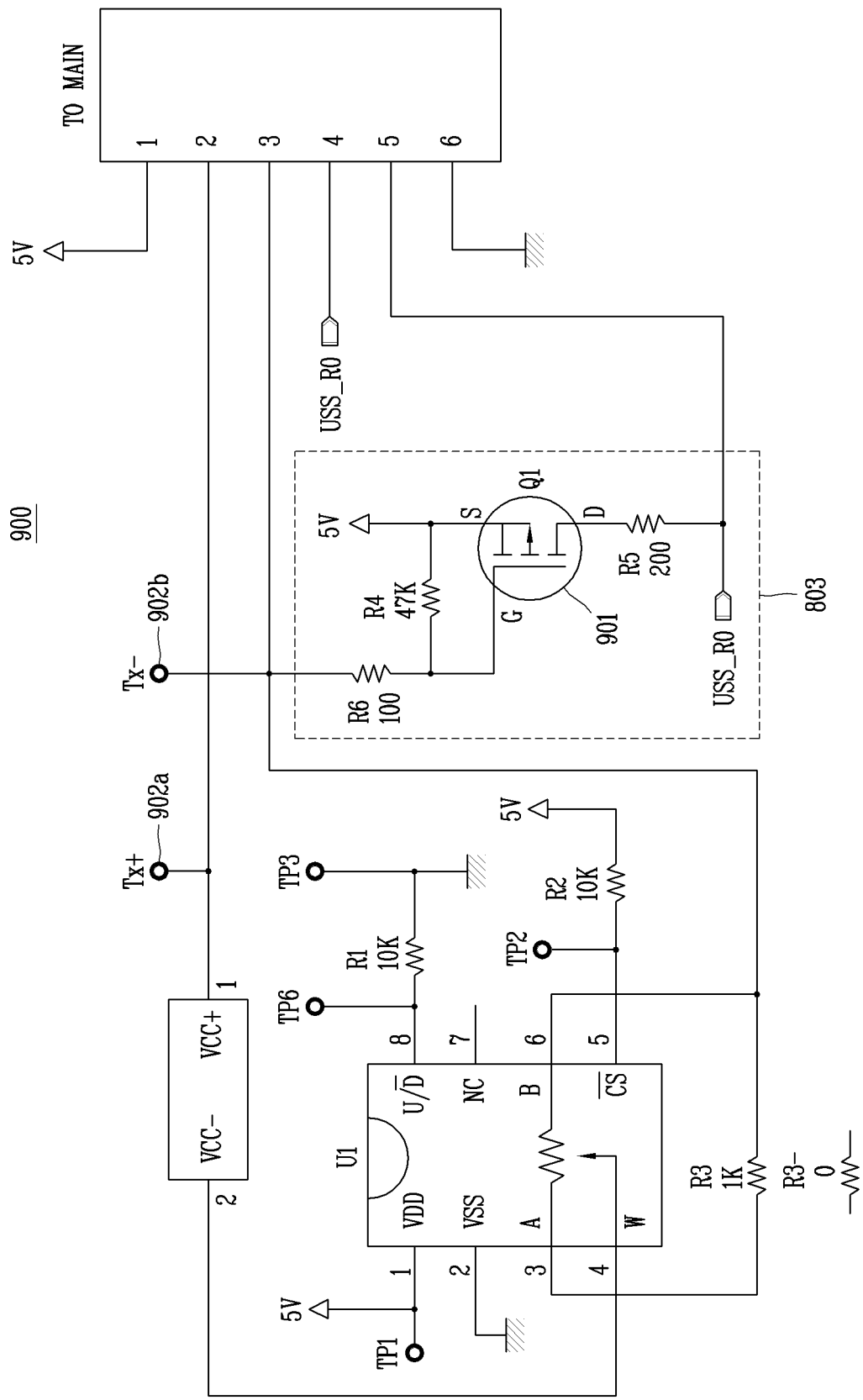
FIG. 9 is a circuit diagram of a transmitter in the ultrasonic sensor according to the present disclosure.

Referring to FIG. 9, a circuit 900 constituting the transmitter 801 is illustrated. Since the circuit constituting the transmitter of the ultrasonic sensor is a known configuration, and thus the detailed description will be omitted.

As illustrated in FIG. 9, the transmitter 801 may include a positive output terminal 902*a* and a negative output terminal 902*b*.

The electrical signal transmission unit 803 may be connected between the negative output terminal 902*b* of the transmitter 801 and either one of the receivers 802*a*, 802*b*.

For example, the electrical signal transmission unit 803 may include a MOSFET (901). Preferably, the electrical signal transmission unit 803 may include P-MOS. At this time, a gate terminal of the MOSFET 901 provided in the electrical signal transmission unit 803 may be connected to the negative output terminal 902*b* of the transmitter 801.

With this configuration, it may be possible to minimize an original signal attenuation phenomenon of the ultrasonic sensor, which may occur as the electrical signal transmission unit 803 is added.

In the following FIG. 10, the outputs of receivers between an ultrasonic sensor having the electrical signal transmission unit 803 and an ultrasonic sensor without having the electrical signal transmission unit 803 will be compared.

Figure 10:
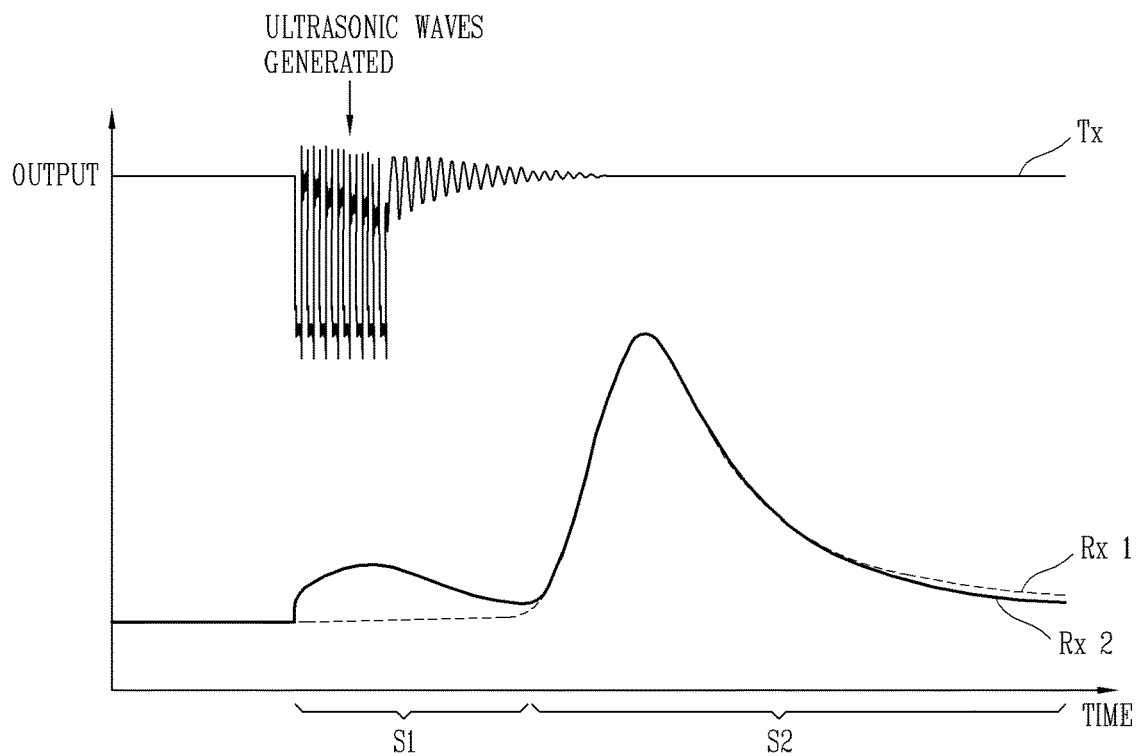
FIG. 10 is a graph comparing an output waveform of the ultrasonic sensor according to the present disclosure and an output waveform of a typical ultrasonic sensor.

Referring to FIG. 10, according to an ultrasonic sensor in the related art, when a predetermined time interval elapses after ultrasonic waves are generated from the transmitter 801, the outputs of the receivers 802*a*, 802*b* (Rx1) increase to a sensible value.

On the other hand, according to an ultrasonic sensor provided with the electric signal transmission unit 803 in accordance with the present disclosure, subsequent to generating ultrasonic waves from the transmitter 801, prior to increasing power corresponding to the ultrasonic waves in the receivers 802*a*, 802*b*, the outputs of the receivers 802*a*, 802*b* (Rx2) varies in response to the electrical signal generated by the signal transmission unit 803.

As described above, an output corresponding to the electrical signal received from the electrical signal transmission unit 803 is defined as a first signal (S1), and an output corresponding to the ultrasound waves is defined as a second signal (S2).

The controller 1800 connected to the ultrasonic sensor may detect information related to the characteristics of the ultrasonic sensor using the first signal.

At this time, the information related to the characteristics of the ultrasonic sensor may include information related to at least one of the manufacturer, type, and model of the ultrasonic sensor.

Meanwhile, the controller 1800 may distinguish the type of the ultrasonic sensor based on the presence or absence of the first signal.

In other words, when the first signal is included in the output of the receiver, the controller 1800 may classify the type of the ultrasonic sensor installed in the main body 110 of the cleaner 100 into an ultrasonic sensor having the electric signal transmission unit 803.

Conversely, when the first signal is not included in the output of the receiver, the controller 1800 may classify the type of the ultrasonic sensor installed in the main body 110 of the cleaner 100 into an ultrasonic sensor without having the electric signal transmission unit 803.

Using this classification method, the following method of manufacturing the cleaner 100 may be implemented.

For example, when a manufacturer of the cleaner 100 is supplied with a first ultrasonic sensor and a second ultrasonic sensor having different characteristics from a plurality of sensor suppliers, the electrical signal transmission unit 803 is installed only in the transmitter of the first ultrasonic sensor.

In addition, the controller 1800 may be designed to classify the ultrasonic sensor provided in the main body 110 as the first ultrasonic sensor when the first signal is included in the output of the receiver of the ultrasonic sensor provided in the main body 110, and as the second ultrasonic sensor when the first signal is not included in the output of the receiver.

In the following FIG. 11, another example related to the output of the ultrasonic sensor having the electric signal transmission unit 803 according to the present disclosure will be described.

Figure 11:
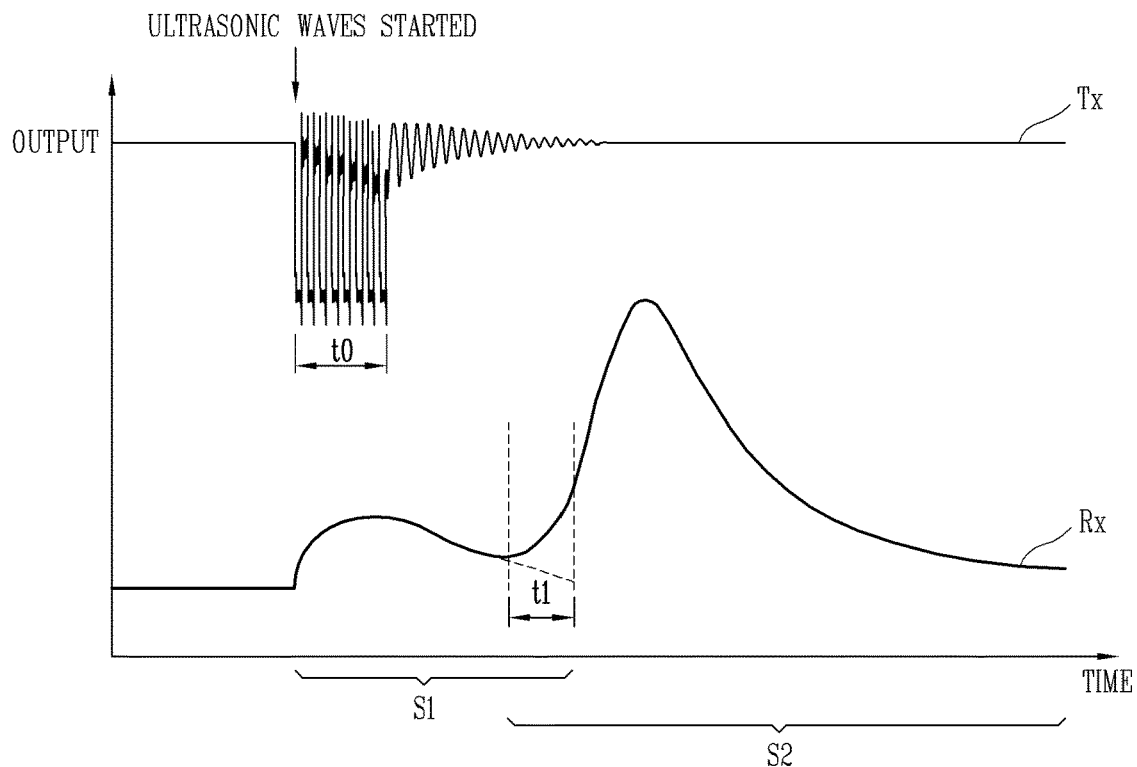
FIG. 11 is a graph showing an example of an output waveform of the ultrasonic sensor according to the present disclosure.

As illustrated in FIG. 11, an output section of the first signal (S1) and an output section of the second signal (S2) may overlap with each other for a predetermined time interval (t1).

Here, in order for the controller 1800 to detect an output waveform of the first signal (S1), the electrical signal transmission unit 803 may transmit an electrical signal to the receivers 802*a*, 802*b* to form an inflection point of the output waveform of the first signal (S1).

Referring to FIG. 11, when an inflection point is formed in the output waveform of the receiver by the first signal (S1), the controller 1800 may detect the first signal (S1) using the formed inflection point. At this time, a time point of formation of the inflection point formed by the first signal (S1) may be different from a time point of formation of the inflection point formed by the second signal (S2). Furthermore, an output level corresponding to the inflection point formed by the first signal (S1) may be different from an output level corresponding to the inflection point formed by the second signal (S2).

In order for the controller 1800 to more accurately detect the first signal, a time point at which the electric signal transmission 803 transmits an electric signal to the receivers 802*a*, 802*b* is preferably within a predetermined time interval (t0) from a time point at which ultrasonic waves are generated.

In particular, it is preferable that a time point of an inflection point formed by the first signal (S1) is preferably within a predetermined time interval (t0) from the time point at which ultrasonic waves are generated.

In the following FIG. 12, the outputs of ultrasonic sensors having different characteristics, each having an electrical signal transmission unit 803 according to the present disclosure, will be compared.

Figure 12:
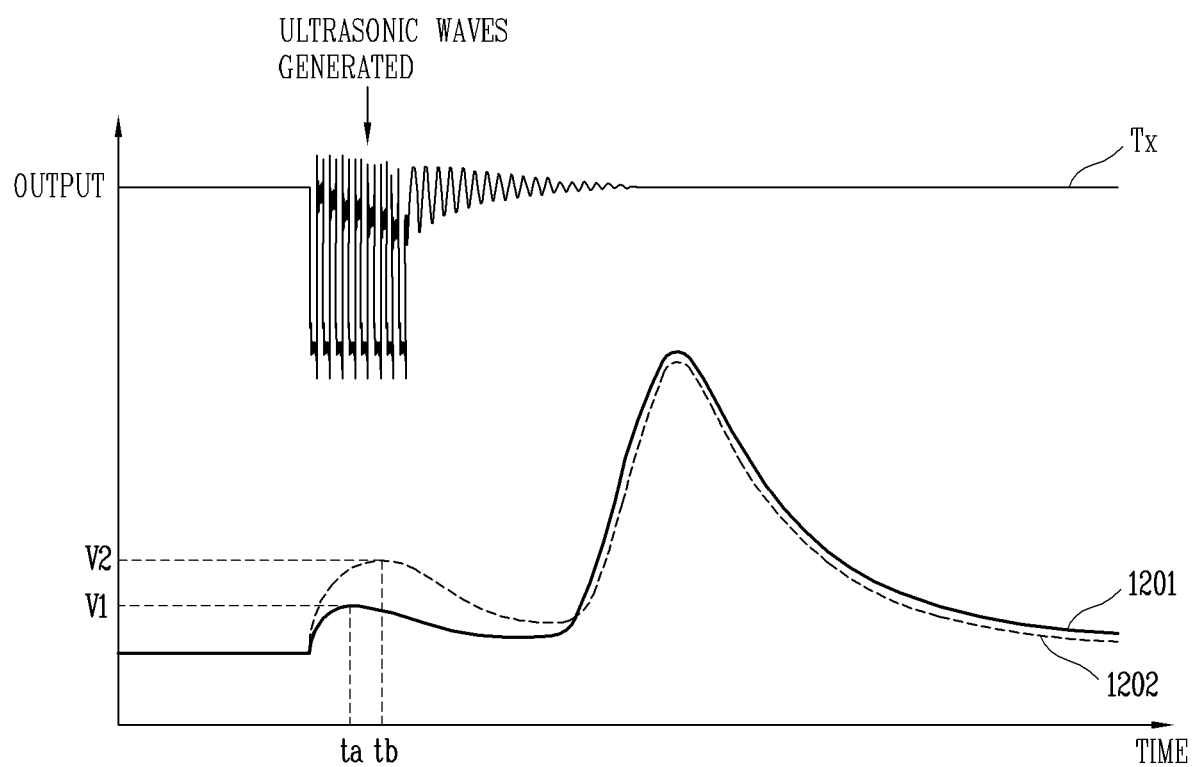
FIG. 12 is a graph showing another example of an output waveform of the ultrasonic sensor according to the present disclosure.

As illustrated in FIG. 12, a first output waveform 1201 represents an output of a receiver in a first ultrasonic sensor, and a second output waveform 1202 represents an output of a receiver in a second ultrasonic sensor.

Referring to FIG. 12, even when the electric signal transmission unit 803 composed of the same circuit is provided, it may be seen that the outputs of the receivers are different depending on the characteristics of the ultrasonic sensors.

In other words, a peak value (V1) of a first signal output by the receiver of the first ultrasonic sensor and a peak value (V2) of a first signal output by the receiver of the second ultrasonic sensor may be different from each other.

In addition, a peak time point (ta) of the first signal output by the receiver of the first ultrasonic sensor and a peak time point (tb) of the first signal output by the receiver of the second ultrasonic sensor may be different from each other.

The controller 1800 connected to the ultrasonic sensor to receive an output of the receiver of the ultrasonic sensor may classify the type of an ultrasonic sensor provided in the main body 110 using at least one of a peak value and a peak time point of the first signal.

In the following FIG. 13, a method of allowing a cleaner 100 provided with an ultrasonic sensor according to the present disclosure to perform autonomous driving will be described.

First, the controller 1800 may initiate an obstacle sensing operation based on an operation mode of the cleaner 100 (S1301).

For example, an operation mode accompanying an obstacle sensing operation may include at least one of a cleaning mode, a driving mode, a remote mode, and a charging mode.

When an obstacle sensing operation is initiated, the controller 1800 may activate the ultrasonic sensor to generate ultrasonic waves from the transmitter 801 of the ultrasonic sensor (S1302).

The controller 1800 may control the transmitter 801 to generate a PWM signal for emitting ultrasonic waves in a predetermined direction by activating the ultrasonic sensor.

The controller 1800 may receive the first signal from the receivers 802*a*, 802*b* after the transmitter 801 emits ultrasonic waves (S1303).

In other words, the controller 1800 may receive the output of the first signal from the receiver through a single harness connecting the ultrasonic sensor to the controller 1800.

For reference, subsequent to receiving the first signal, the controller 1800 may also receive the output of the second signal from the receiver through a single harness connecting the ultrasonic sensor to the controller 1800.

Moreover, the controller 1800 may detect information related to the characteristics of the ultrasonic sensor using the received first signal.

Meanwhile, the controller 1800 may distinguish an output of the first signal and an output of the second signal transmitted from the receivers 802a, 802b based on a time point at which ultrasonic waves are generated from the transmitter 801.

Specifically, the controller 1800 may determine a signal generated closer to a time point at ultrasonic waves are generated by the transmitter 801 as a first signal between the outputs of the first and second signals.

Specifically, the controller 1800 may compare an output level of the received first signal with a reference value (S1304).

When the output of the first signal is greater than a reference value, the controller 1800 may select a first algorithm among a plurality of algorithms previously stored in the memory 1700 (S1305a).

Specifically, when the output of the first signal is greater than the reference value, the controller 1800 may detect information related to at least one of the type, model, and manufacturer of the ultrasonic sensor that has transmitted the first signal.

In addition, the controller 1800 may select a first algorithm from a plurality of algorithms stored in the memory 1700 based on at least one of the detected type, model, and manufacturer of the ultrasonic sensor that has transmitted the first signal.

Moreover, the controller 1800 may analyze a second signal received from the receiver subsequent to the first signal based on the selected first algorithm (S1306a).

When the output of the first signal is less than the reference value, the controller 1800 may select a second algorithm from a plurality of algorithms previously stored in the memory 1700 (S1305b).

The controller 1800 may select a second algorithm from a plurality of algorithms even when it is determined that the ultrasonic sensor does not output the first signal.

Likewise, the controller 1800 may analyze the second signal received from the receiver subsequent to the first signal based on the selected second algorithm (S1306b).

As such, the controller 1800 may detect information related to the characteristics of the ultrasonic sensor based on the waveform characteristics of the first signal.

On the other hand, the memory 1700 may store a database formed by variables related to the waveforms of first signals output by a plurality of different ultrasonic sensors and the identifiers of a plurality of algorithms stored in advance.

Subsequent to detecting a variable related to a waveform of a first signal, the controller 1800 may search for at least one algorithm corresponding to the detected variable among the plurality of algorithms stored in the memory 1700 using the database.

In other words, in FIG. 13, an output level of a first signal has been described as an example as a reference for classifying at least one of the type, model, and manufacturer of an ultrasonic sensor. However, a criterion for classifying ultrasonic sensors in the present disclosure are not limited thereto.

For example, the controller 1800 may detect information related to the type of the ultrasonic sensor based on a time point at which an output of the first signal forms an inflection point or a length of an overlapping section between the first signal and the second signal.

In another example, the controller 1800 may detect information related to the type of the ultrasonic sensor based on whether the receiver outputs the first signal.

As such, the controller 1800 may analyze the second signal based on the selected algorithm, and calculate a distance between an obstacle and the main body 110 based on the analysis result.

On the other hand, although not shown in the drawing, the controller 1800 may detect information related to the type, model, and manufacturer of the ultrasonic sensor using the first signal, and then store the detected information in the memory 1700.

In addition, when it is determined that the ultrasonic sensor installed in the main body 110 is broken, the controller 1800 may control the output unit 1500 to output information related to the failure of the ultrasonic sensor.

For example, the information related to the failure of the ultrasonic sensor may include at least one of information related to the type, model, and manufacturer of the ultrasonic sensor.

In another example, the information related to the failure of the ultrasonic sensor may include at least one of information related to a failure time of the ultrasound sensor, a cause of the failure, and an initial installation time.

According to the present disclosure, an effect of allowing a user or an administrator of a cleaner to receive information related to at least one of a product name, a type, and a manufacturer of an ultrasonic sensor installed in the robot cleaner without disassembling the robot cleaner is derived.

As a result, when the ultrasonic sensor previously installed in the robot cleaner is broken, the manager of the cleaner may prevent a malfunction of the cleaner by replacing it with an ultrasonic sensor of the same product as the relevant ultrasonic sensor.

Furthermore, according to the present disclosure, the user of the cleaner may distinguish the type of an ultrasonic sensor installed in the robot cleaner without changing the design of the controller of the robot cleaner, thereby enhancing user convenience.

In addition, according to the present disclosure, the controller of the cleaner may distinguish the type of the ultrasonic sensor using the output waveform of the ultrasonic sensor, thereby accurately analyzing the output of the ultrasonic sensor.

What is claimed is:

1. An ultrasonic sensor comprising:
    a transmitter that emits ultrasonic waves;
    a plurality of receivers installed at positions spaced apart from the transmitter by a predetermined distance to receive ultrasonic waves emitted from the transmitter; and
    an electrical signal transmission unit electrically connecting the transmitter and at least one of the plurality of receivers,
    wherein the electrical signal transmission unit transmits a predetermined electrical signal to a receiver connected to the transmitter in addition to the ultrasonic waves emitted from the transmitter,
    wherein electrical signal transmission unit transmits a predetermined electrical signal to the receiver when the transmitter emits ultrasonic waves;
    wherein the electrical signal transmission unit transmits the predetermined electrical signal to the receiver before the ultrasonic waves emitted by the transmitter reach the receiver, and
    wherein the electrical signal transmission unit transmits the predetermined electrical signal to the receiver such that an overlapping region between a first signal output by the receiver in response to the electrical signal and a second signal output by the receiver in response to ultrasonic waves emitted by the transmitter is below a predetermined time interval.

2. The ultrasonic sensor of claim 1, wherein the electrical signal transmission unit transmits the predetermined electrical signal to the receiver before the receiver increases an output above a predetermined value in response to the ultrasonic waves emitted by the transmitter.

3. The ultrasonic sensor of claim 1, wherein the electrical signal transmission unit transmits the predetermined electrical signal to the receiver before an increase rate of output of the receiver is changed from a positive value to a negative value while the receiver changes an output in response to the ultrasonic waves emitted by the transmitter.

4. The ultrasonic sensor of claim 1, wherein the receiver outputs the first signal based on the reception of the electrical signal received from the electrical signal transmission unit, and outputs the second signal based on the reception of ultrasonic waves emitted by the transmitter.

5. The ultrasonic sensor of claim 1, wherein the receiver outputs the first signal prior to the second signal.

6. The ultrasonic sensor of claim 5, wherein a time range in which the first signal is output and a time range in which the second signal is output overlap with each other within a predetermined time interval.

7. The ultrasonic sensor of claim 1, wherein the transmitter has a positive output terminal and a negative output terminal, and
the electrical signal transmission unit is connected between the negative output terminal and any one of the plurality of receivers.

8. The ultrasonic sensor of claim 7, wherein the electric signal transmission unit comprises a MOSFET.

9. The ultrasonic sensor of claim 8, wherein a gate terminal of the MOSFET is connected to a negative output terminal of the transmitter.

10. The ultrasonic sensor of claim 1, wherein a level of the electrical signal transmitted to the receiver by the electrical signal transmission unit is variably set.

11. The ultrasonic sensor of claim 1, wherein the electrical signal transmission unit is turned off so as not to transmit an electrical signal to the receiver when a period during which the transmitter generates ultrasonic waves is reduced below a threshold period.

12. A robot cleaner performing autonomous driving, the robot cleaner comprising:
a main body;
a driving unit configured to move the main body;
an ultrasonic sensor configured to sense a distance between the main body and an obstacle; and
a controller configured to control the driving unit using an output value of the ultrasonic sensor,
where the ultrasonic sensor comprises:
a transmitter installed at a point on an outer surface of the main body to emit ultrasonic waves in a predetermined direction;
a plurality of receivers installed at positions spaced apart from the transmitter by a predetermined distance on the outer surface of the main body to receive ultrasonic waves emitted from the transmitter and then reflected by the obstacle; and
an electrical signal transmission unit electrically connecting the transmitter and at least one of the plurality of receivers, and
wherein the electrical signal transmission unit transmits a predetermined electrical signal to the receiver in addition to ultrasonic waves emitted from the transmitter,
wherein the electrical signal transmission unit transmits the predetermined electrical signal to the receiver before ultrasonic waves emitted by the transmitter reaches the receiver,
wherein the receiver
outputs a first signal based on the reception of the electrical signal received from the electrical signal transmission unit, and
outputs a second signal based on the reception of ultrasonic waves emitted by the transmitter, and
wherein the electrical signal transmission unit transmits the predetermined electrical signal to the receiver such that an overlapping region between the first signal output by the receiver in response to the electrical signal and
the second signal output by the receiver in response to ultrasonic waves emitted by the transmitter is below a predetermined time interval.

13. The robot cleaner of claim 12, wherein a circuit constituting the electrical signal transmission unit is installed separately in a different position from a circuit constituting the controller.

14. The robot cleaner of claim 12, wherein the receiver outputs the first signal prior to the second signal.

15. The robot cleaner of claim 12, wherein the controller receives an output of the first signal and an output of the second signal through a single harness.

16. An ultrasonic sensor comprising:
a transmitter that emits ultrasonic waves;
a plurality of receivers installed at positions spaced apart from the transmitter by a predetermined distance to receive ultrasonic waves emitted from the transmitter; and
an electrical signal transmission unit electrically connecting the transmitter and at least one of the plurality of receivers,
wherein the electrical signal transmission unit transmits a predetermined electrical signal to a receiver connected to the transmitter in addition to the ultrasonic waves emitted from the transmitter,
wherein the electrical signal transmission unit is turned off so as not to transmit an electrical signal to the receiver when a period during which the transmitter generates ultrasonic waves is reduced below a threshold period.

* * * * *